(12) United States Patent
Gudmundson et al.

(10) Patent No.: US 6,508,908 B2
(45) Date of Patent: Jan. 21, 2003

(54) METHOD AND APPARATUS FOR SPLICING PHOTOGRAPHIC FILMS

(75) Inventors: Gunnar Gudmundson, Somers, CT (US); Douglas A. Kenyon, Brimfield, MA (US); Leslie G. Weidman, Russell, MA (US)

(73) Assignee: Gretag Imaging, Inc., Holyoke, MS (US)

( * ) Notice: Subject to any disclaimer, the term of this patent is extended or adjusted under 35 U.S.C. 154(b) by 13 days.

(21) Appl. No.: 09/877,307

(22) Filed: Jun. 8, 2001

(65) Prior Publication Data

US 2002/0185220 A1 Dec. 12, 2002

(51) Int. Cl.$^7$ ............................................... B65H 21/00
(52) U.S. Cl. ............................... 156/304.3; 156/304.1; 156/502; 156/505
(58) Field of Search ..................... 156/157, 304.1, 156/304.3, 502, 505

(56) References Cited

U.S. PATENT DOCUMENTS

| | | | | |
|---|---|---|---|---|
| 2,611,724 A | * | 9/1952 | Wittenberg | 156/509 |
| 2,725,920 A | * | 12/1955 | Kristoff | 156/509 |
| 3,622,425 A | * | 11/1971 | Savarick | 156/502 |
| 4,370,184 A | * | 1/1983 | Jensen et al. | 156/157 |
| 4,561,924 A | | 12/1985 | Hope et al. | |
| 4,894,675 A | | 1/1990 | Würfe et al. | |
| 5,347,338 A | | 9/1994 | Weibel | |
| 5,650,033 A | * | 7/1997 | Shimamura et al. | 156/353 |
| 5,651,854 A | * | 7/1997 | Shimamura et al. | 156/157 |
| 5,656,125 A | | 8/1997 | Tanaka | |
| 5,716,491 A | * | 2/1998 | Arimoto | 156/159 |

FOREIGN PATENT DOCUMENTS

EP 0 681 960 A1 11/1995

* cited by examiner

*Primary Examiner*—Mark A. Osele
(74) *Attorney, Agent, or Firm*—Peter F. Corless; Steven M. Jensen; Edwards & Angell, LLP

(57) ABSTRACT

An apparatus and method for splicing photographic films is disclosed, where the films are conveyed along a path and supported by a track element. Upon being positioned to receive a splice, the films are clamped between a movable splice pad and the track clement. The clamping action produced by the movable splice pad substantially eliminates the problem of film foldovers caused by curling at the trailing end of a film. A splice head is lowered to apply a splice tape to the films, thereby forming the splice. The films are spliced together in a flattened state, producing a continuous web of film which can be wound onto a roll or core for further processing.

20 Claims, 4 Drawing Sheets

METHOD AND APPARATUS FOR SPLICING PHOTOGRAPHIC FILMS

BACKGROUND OF THE INVENTION

1. Field of the Invention

The present invention resides in the field of photographic processing systems, and more particularly relates to a method and apparatus for splicing photographic films onto a common roll or core which is to be developed in a photographic processing machine.

2. Background

Film processing systems and, in particular, film splicing and desplicing machines, are known in the art. Such machines are commonly used in central film laboratories to achieve efficiencies in film development and processing operations. A plurality of rolls of film can be developed more efficiently by splicing together the film on a common roll, developing the film, and then desplicing the film to separate it into the original rolls, as compared with processing the rolls separately. Splicing machines and processes are particularly useful with Advanced Photo System (APS) film. With APS film, the film is removed from each cartridge and spliced with other rolls of film for development. After being developed, the web of film is desplicсed and a continuous set of negatives is reinserted in each corresponding cartridge. Thus, APS film customarily is processed in a manner different from 135 film (for which the film process usually involves cutting the negatives in strips and returning the cut negatives to the customer); with APS film, the negatives are returned as a continuous roll inside the original film cartridge. Splicing and desplicing operations are important steps in the processing of APS film, but certain problems are prevalent in conventional splicing processes. The tendency of the film tail to curl has resulted in a problem of film "foldover," as explained below, which has not heretofore been adequately resolved.

In a splicing operation, a trailing end of a first film is spliced to a leading end of a second film. A typical arrangement is shown in FIG. 6, where the trailing end 82 of the first film 80 is spliced to the leading end 86 of the second film 84 using a splice tape 88. FIG. 7 is a cross-sectional view of a splicing operation including a reciprocating splice head 90 which is lowered to fix the splice tape 88 over the trailing end of the film 80 and the leading end of the film 84. As shown in FIG. 7, the trailing end 82 of the film 80, which was previously wound tightly around the core of a film cartridge, tends to retain some curl at its end thereof. When the splice head 90 is lowered to apply the splice tape 88, any portion of the film 80 positioned under the splice head becomes part of the splice. Accordingly, if the trailing edge 82 of the film 80 exhibits some curl, this curved tail portion becomes sandwiched in the splice. In FIG. 7, the film 80 has been spliced in the folded condition, resulting in an added splice thickness in the region of the fold and thus film "foldover." This added thickness is undesirable and creates a pressure mark on successive wraps of the film wound onto a reel or core. The pressure mark is detrimental to other operations in the film developing process, for example showing up on negatives as a visible mark in the image area after developing. The pressure mark will also be visible on any prints made from the negative.

Previous attempts to solve the above-described problem involved use of the following implements: (1) an airjet, or (2) a mechanical element to bend back the film. Air jets are very expensive and difficult to maintain because tight tolerances are required. The aerodynamic effects of the air stream and the angle at which the air stream is positioned are important factors which, if not provided almost exactly in accordance with film feed requirements, can result in the film strip eluding the air stream, thus rendering the airjet useless. Mechanical "bending" elements can cause significant damage to the surface of the film by, for example, causing the film surface to abrade or the emulsion to crack or break off. Further, such mechanical elements are not always effective in "catching" the curled tail section of the film.

U.S. Pat. No. 5,656,125 ('125 patent) discloses a film splicer including a reciprocating head 34 opposed by a pad 36, where films 12 are conveyed therebetween, and the head 34 is lowered to fix a splicing tape 39 to the films 12. The '125 patent is directed to the problem of the splicing tape tending to adhere to the pad during a splicing operation. As shown in FIG. 1 of the '125 patent, e.g., a concave portion 38 is cut in the pad 36 so as to avoid contact between the tape 39 and the pad 36 during splicing. The '125 patent does not address the film "foldover" problem described herein.

SUMMARY OF THE INVENTION

We have found that an improved splice can be formed between photographic films substantially without resulting in film "foldover" or causing the formation of damaging pressure marks. An apparatus and method of forming a splice according to the present invention includes a movable anvil plate (i.e. splice pad) which clamps two film strips to a film track element where a splice is to be formed, thereby straightening any curl in the film and providing a surface to receive a splice head. The film track element provides support to the edges of the films from above and thus eliminates some curl or foldover. A cylinder then actuates the splice pad and moves the splice pad toward the film track element to clamp the films therebetween for receiving the splice head. A separate splice head cylinder is actuated, advancing the splice head downward toward the splice pad to form a splice. In a preferred embodiment, the splice head continues moving downward to force the splice pad down toward its rest position. The splice head preferably engages with the splice head for a sufficient time to adhere a splice tape to the two film strips.

BRIEF DESCRIPTION OF THE DRAWINGS

For a fuller understanding of the nature of the present invention, reference is made to the following detailed description taken in conjunction with the accompanying drawing figures wherein like reference characters denote corresponding parts throughout the several views and wherein.

DETAILED DESCRIPTION OF THE INVENTION

Figure 1:
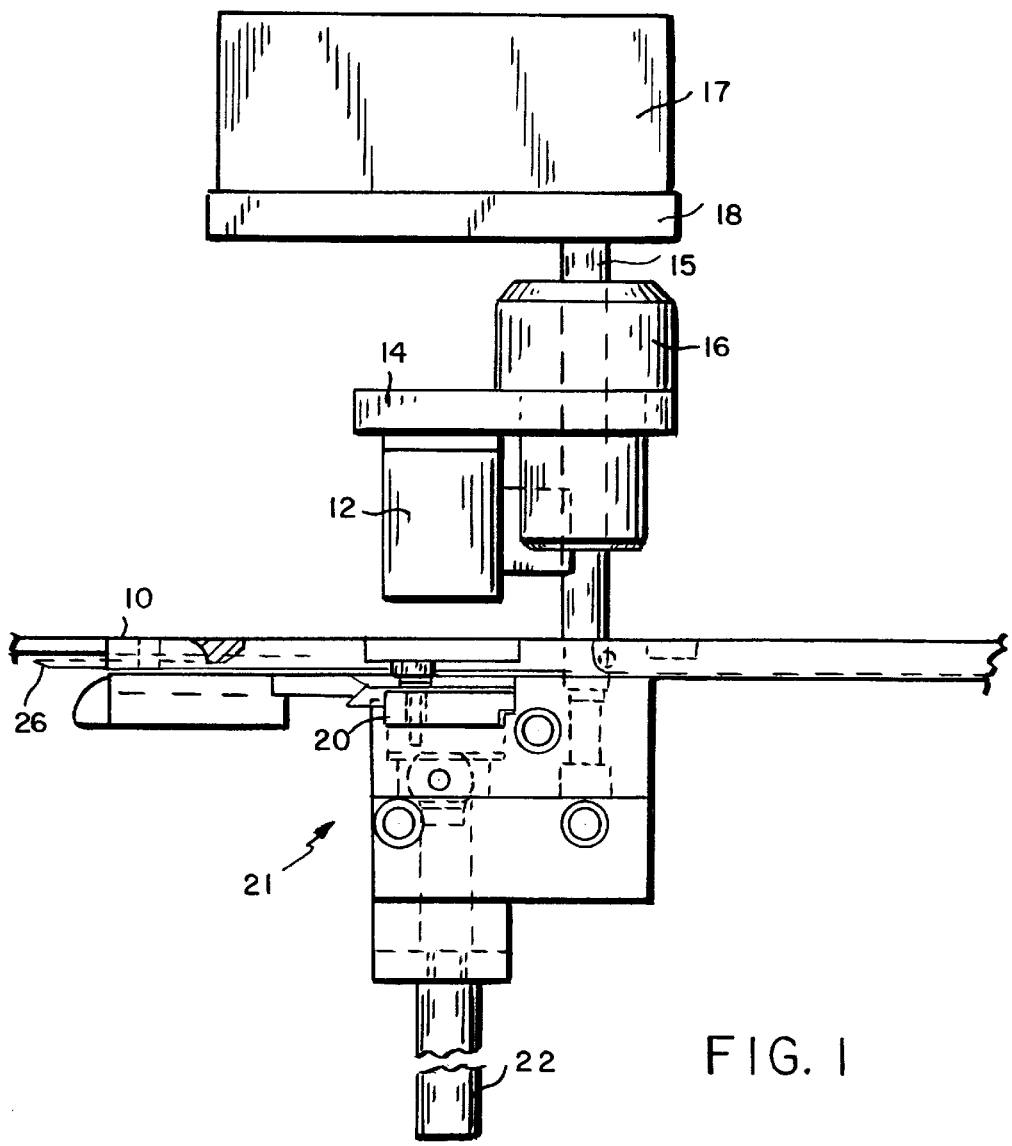
FIG. 1 is a cross-sectional side view of a splicing apparatus including a movable splice pad and a splice head of the present invention.

FIG. 1 illustrates a photographic film splicer configured and arranged around a film track element 10, the film track element for guiding one or more films 26 along a horizontal path through the film splicer. The film splicer includes a splice head 12 preferably arranged above the film path, and a splice pad assembly 21 with a splice pad 20 preferably arranged below the film path. The splice head 12 and splice pad 20 are initially positioned outside the film track element 10, i.e. preferably above and below the horizontal path, respectively. The splice head 12 is supported from above by a support plate 14, the support plate being attached to a shaft 15 by a linear bearing 16. An air cylinder 17 is preferably positioned on a support 18 and operably connected to the support plate 14 via the shaft 15. The air cylinder controls up and down movement of the support plate 14 and thus moves the splice head 12 into contact with first and second films on the path below to form a splice. Splice tape is supplied to the splice head 12 to be heat sealed on the films, where the splice tape is preferably a heat activated adhesive tape. The splice tape can be a continuous length of tape which is cut by the splice head 12; alternatively, individual pre-cut lengths of tape can be fed to the splice head 12. Arranged below the film path, the splice pad 20 is movable toward and away from the splice head 12 to thereby clamp the films to the film track element 10 prior to forming the splice.

Figure 6:
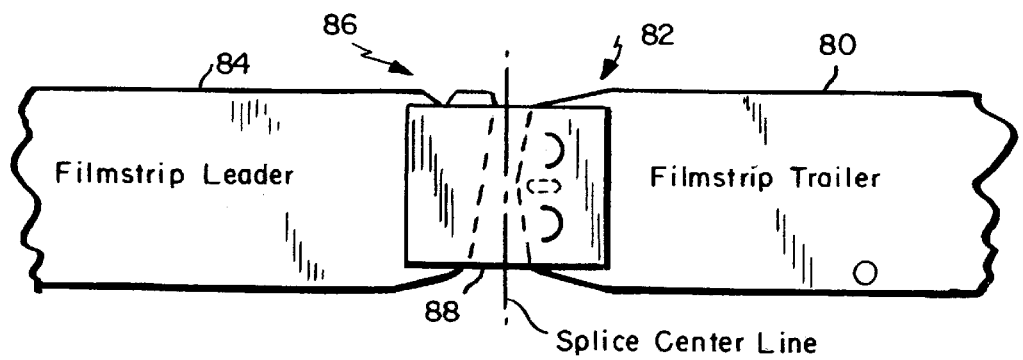
FIG. 6 is a top view of first and second film strips joined together by a splicing tape, in accordance with the present invention.

FIG. 6 illustrates a typical arrangement of a first film strip 80 and a second film strip 84 which are spliced together by a splice tape 88. A trailing end 82 of the first film strip can include a tapered portion in accordance with the standard specifications of APS film. A leading end 86 of the second film strip is pointed, which facilitates joining to the tapered trailing end of the first film strip. Alternatively, neither or both ends can be pointed or tapered, and for example, both ends can be straight and flat. The preferred pointed leading end of the second film strip is also standard with APS films and is useful for feeding the film.

Figure 7:
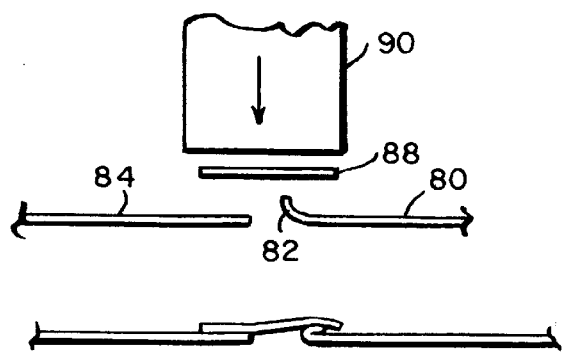
FIG. 7 is a schematic depiction of film foldover as encountered in prior art splicing devices.

FIG. 7 illustrates a typical problem encountered with prior art film splicing devices, whereby the trailing end of the first film strip naturally tends to curl, since the trailing end 82 was previously wound tightly around the core of a film cartridge. In prior art devices, this curled tail section of the film strip tends to fold onto itself. When a splice head 90 is lowered to fix a splice tape 88 over the first and second film strips, the tail section becomes folded under the splice, thus resulting in the problem of film "foldover."

Figure 8:
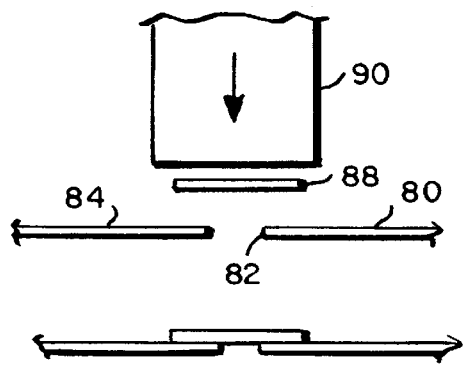
FIG. 8 is a schematic depiction of a first film strip decurled and spliced together with a second film strip, in accordance with the present invention.

In accordance with the method and apparatus of the present invention, film foldover is substantially eliminated. The film is decurled prior to the lowering of the splice head and application of the splice tape 88 to form the splice. As discussed below, the film strips (films) are clamped to the film track element, thereby removing any curl from the film tail and producing a good splice, as shown in FIG. 8.

Figure 2:
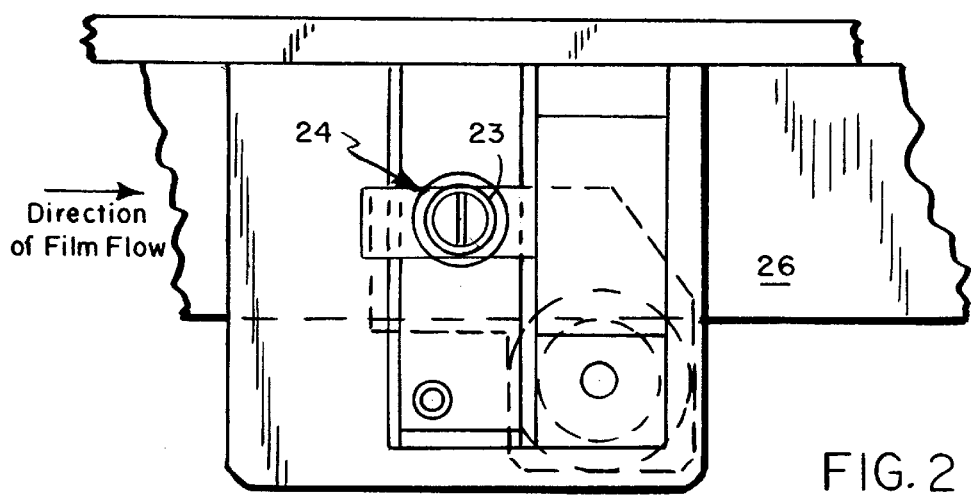
FIG. 2 is a top plan view of the splicing apparatus of FIG. 1.
Figure 5:
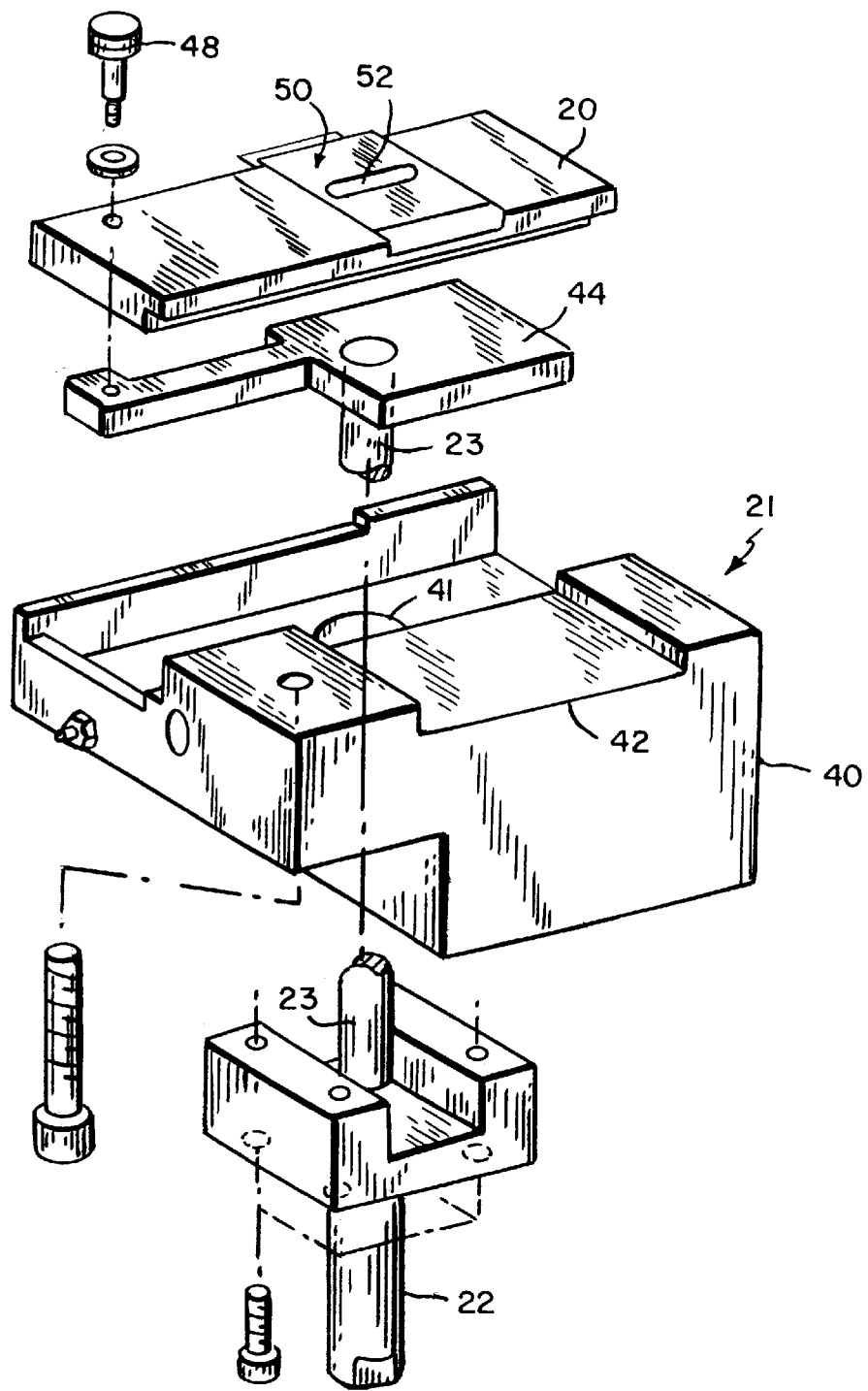
FIG. 5 is an exploded parts view of the movable splice pad of the present invention.

With reference to FIGS. 1 and 2, the films 26 (corresponding to film strips 80 and 84) are conveyed along the film path using conventional rollers (not shown) and precisely positioned under the splice head 12 using a conventional array of sensors or other known positioning elements (not shown). As shown in FIG. 6, the leading end 86 of the second film strip can be brought to within a short distance of the trailing end 82 of the first film strip. In a particular embodiment, this distance or gap can be approximately 3.25 mm to a tolerance of approximately ±0.75 mm. The splice tape 88 is applied centrally over this gap to within approximately 0.5 mm in either direction. This gap between the films preferably is positioned over a cut-out area of the splice pad, as discussed below with reference to FIG. 5.

Figure 3:
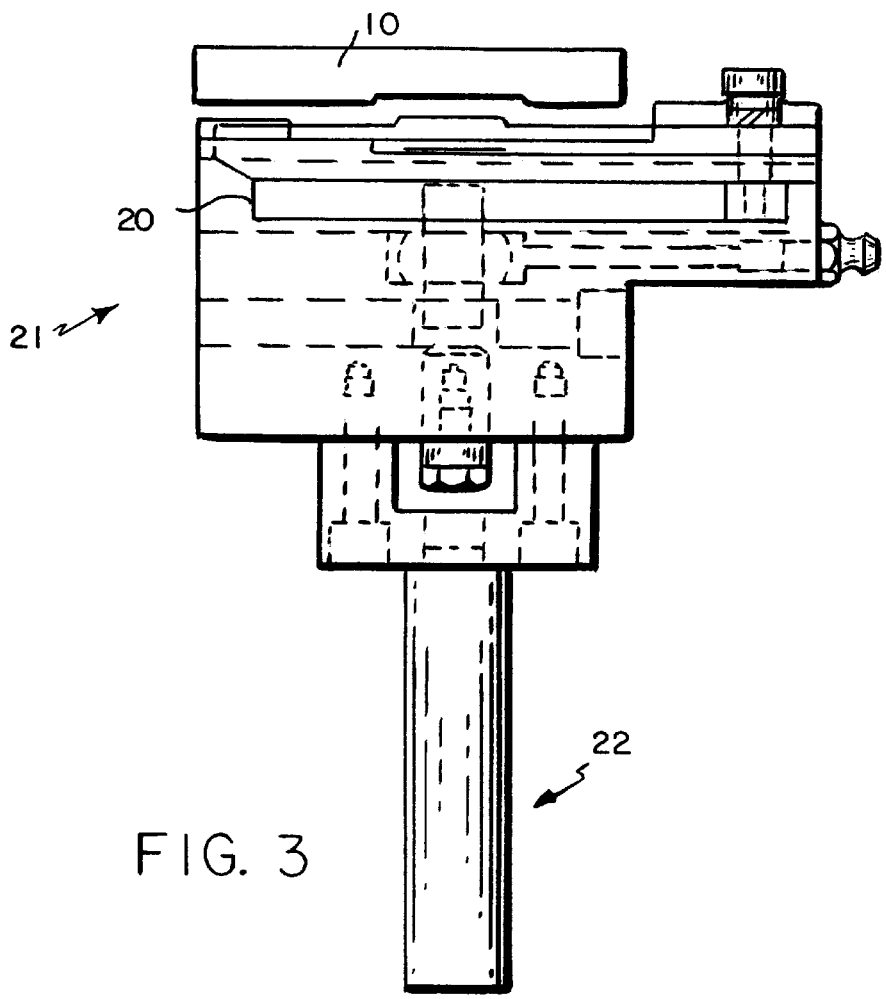
FIG. 3 is cross-sectional front view of the movable splice pad of the present invention.
Figure 4:
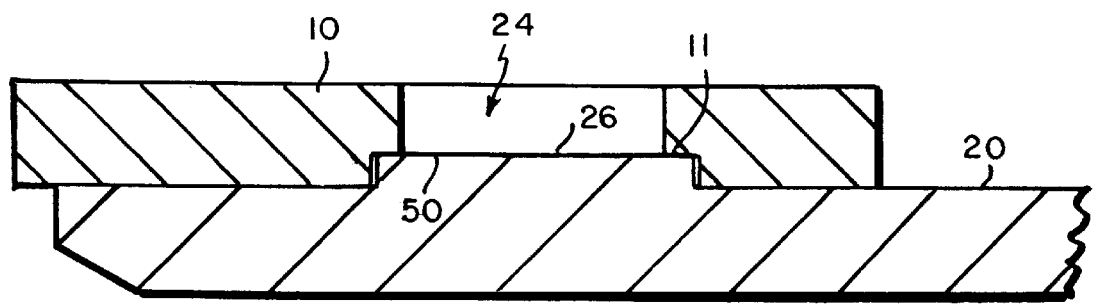
FIG. 4 is an enlarged front view of a portion of the movable splice pad of FIG. 3.

As shown in FIGS. 3 and 4, the film path includes the film track element 10 positioned along the track to guide the films 26 from immediately above. A small rim area 11 on either side of the film track element 10 can contact the film along the edges as it is being conveyed through the film processing apparatus. The rim area 11 only touches the film immediately along the edges thereof, in order to prevent damage to the emulsion area of the film.

When the leading end of a first film and the trailing end of a second film are positioned under the splice head 12, the splice pad is actuated and a cylinder 22 moves the splice pad 20 toward the film track element 10. The splice pad assembly 21 is shown in detail in FIG. 5. The splice pad assembly includes a main body 40 having a central bore 41 which can include a bearing (not shown) for receiving the cylinder 22. The main body preferably is positioned outside the film path and generally remains stationary during a splicing operation. Positioned above the main body is a pad insert section 44 having a pin 23 for receiving the cylinder 22. The splice pad 20 is positioned above the pad insert section 44 and fastened to the splice pad by a screw 48 or other standard connecting element. The splice pad 20 and pad insert section 44 rest above the main body 40 and can move up and down as the pin 23 is forced by the cylinder 22.

The splice pad 20 preferably includes a smooth upper surface in contact with the films 26 during splicing. The splice pad 20 is received in the film track element 10 above to thereby clamp the films 26 as they are being conveyed along a path (see, e.g., FIG. 2). On its upper surface, the splice pad 20 includes an elevated track guide 50 which mates with the film track element 10 to fix the films 26 for splicing. As seen in FIG. 4, the elevated track guide 50 fits within the rim area 11 of the film track element to clamp the films therein. The track guide 50 includes a cut-out area 52 for receiving a "sticky" side of the splice tape, thereby preventing the splice tape from adhering to the splice pad 20.

In operation, first and second films 26 are conveyed to an appropriate position immediately below the splice head 12 to receive a splice tape. An ideal position is illustrated in FIG. 8, in which the films 26 are represented by first film strip 80 and second film strip 84. A small gap exists between the film strips 80 and 84 to prevent film overlap and thus receive the splice tape 88. Preferably, this gap is centered over the cutout area 52 in the track guide 50. The films are conveyed until they stop at desired positions. When thus positioned, the films are supported along their edges from above by the track element 10. The track element functions to eliminate some foldover or curl which can be present near the trailing end of the first film by providing support from above. The cylinder 22 is then actuated, causing the splice pad 20 to move upwardly toward the film track element. The cylinder 22 clamps the films against the film track element 10. This clamping action substantially eliminates any curl or film foldover that can be present near the trailing end of the first film. The films to be joined are essentially flat, and the splice head 12 is then lowered, as shown in FIG. 8.

To lower the splice head 12, the splice head cylinder 17 is actuated, causing the plate 14 and the splice head 12 to move downwardly toward the film track element 10. As shown in FIGS. 2 and 4, the splice head 12 moves downward while centered relative to the bore 24 in the film track element to thereby apply a splice tape and heat seal the tape onto the films 26. Under the heat and pressure of the splice head 12, the splice tape is applied to form a splice between the films, as shown, e.g., in FIG. 8.

Preferably, the cylinder 17 operating the splice head is driven downward with a force sufficient to overcome the cylinder 22 operating the splice pad. As the splice head 12 contacts the film to form the splice, the splice head continues moving downward and forces the splice pad 20 downward. This continued downward movement allows further time for a satisfactory heat seal to form between the films, thereby ensuring that the splice tape will remain adhered to the two films. The cylinder 17 can continue driving the splice head 12 and the splice pad 20 downward until the splice pad 20 is at its original rest position. Alternatively, the cylinder 17 can continue moving downward for a preset length of time or until the splice pad reaches a predetermined position. The cylinder 17 then releases from the splice/splice pad and retracts to its original rest position.

In an alternative embodiment, the splice head can retract after forming a splice which joins the films 26. The splice pad 20 then moves downward to prevent interference with the now joined films 26 being conveyed past the splicing section. In this embodiment, the splice head cylinder 17 and the splice pad cylinder 22 can be of approximately the same size, such that the forces exerted by the cylinders 17 and 22 are approximately equal. It is not necessary that the splice head cylinder 17 force the splice pad 20 down after the splice has formed.

In a further alternative embodiment, the splice pad cylinder 22 can be operated with a greater force than the splice head cylinder 17. In such an arrangement, after the splice head 12 is lowered into contact with the films 26 being joined, a portion of the splice pad (e.g. the elevated track guide 50) detachable from the remainder of the splice pad continues moving upward, and the cylinder 22 overpowers the splice head cylinder 17. Additional time can then be provided so that a satisfactory heat seal is formed. When the splice head 12 and support plate 14 reach a predetermined level (e.g. the rest position of the splice head), the cylinder 22 can be retracted.

In a still further alternative embodiment, a different arrangement reversing the positions of the splice head and the splice pad can be used. For example, the orientation of the film track element can be reversed, such that the heat seal is applied from a position beneath the film track, instead of above it.

The above-described splice head and movable splice pad can be retrofitted to existing photographic processing machines, in some cases simply by replacing the fixed splice pad (anvil pad) present in conventional splicing arrangements. A tracking element must also be provided which clamps with the splice pad to eliminate any curl present in the film.

Although the invention has been described in detail including the preferred embodiments thereof, such description is for illustrative purposes only, and it is to be understood that changes and variations including improvements may be made by those skilled in the art without departing from the spirit or scope of the following claims.

What is claimed is:

1. An apparatus for forming a splice between at least two photographic films, comprising:

a film track element which supports the films along first and second edges of the films;

a splice pad movable from a first position outside the film track element to a second position in engagement with the film track element to clamp the films therebetween and substantially eliminate any curl in the films; and a splice head which applies a splice tape to the films.

2. The apparatus of claim 1, wherein the splice pad includes an elevated guide which engages the films and thereby clamps the films to the film track element.

3. The apparatus of claim 2, wherein the film track element includes a rim to support the films along the first and second edges thereof.

4. The apparatus of claim 3, wherein the elevated guide fits within the rim to clamp the films to the film track element.

5. The apparatus of claim 2, wherein the elevated guide includes a cut-out area for receiving the splice tape.

6. The apparatus of claim 1, and further including a first cylinder for driving the splice head and a second cylinder for driving the splice pad.

7. The apparatus of claim 6, wherein the first cylinder drives the splice head into contact with the films and overcomes a driving force applied by the second cylinder, thereby forcing the splice pad toward the first position.

8. The apparatus of claim 6, wherein the first cylinder drives the splice head into contact with the films, and the second cylinder drives the splice pad into contact with the film track element.

9. A method for forming a splice between at least two photographic films conveyed along a horizontal path, comprising the steps of:

providing a film track element for guiding the films along first and second edges of the films;

positioning the films between a splice head and a splice pad;

advancing the splice pad from a first position outside the film track element to a second position in engagement with the film track element to clamp the films therebetween and substantially eliminate any curl in the films; and lowering the splice head to apply a splice tape to the films.

10. The method of claim 9, wherein the splice pad includes an elevated guide which engages the films and thereby clamps the films to the film track element.

11. The apparatus of claim 10, wherein the film track element includes a rim to support the films along the first and second edges thereof.

12. The apparatus of claim 11, wherein the elevated guide fits within the rim to clamp the films to the film track element.

13. The method of claim 10, and further including a step of receiving the splice tape in a cut-out area of the elevated guide.

14. The method of claim 9, and further including, following the lowering step, a step of driving the splice pad from the second position back to the first position.

15. The method of claim 9, and further including, following the lowering step, a step of driving the splice head and the splice pad from the second position to the first position.

16. An apparatus for forming a splice between at least two photographic films conveyed along a horizontal path, comprising:

a film track element having rim portions to support the films along first and second edges of the films;

a splice pad movable from a first position outside the film track element to a second position in which an elevated portion engages the film track element to clamp the films to the rim portions and substantially eliminate any curl in the films; and a splice head which applies a splice tape to the films.

17. The apparatus of claim 16, wherein the elevated guide includes a cut-out area for receiving the splice tape.

18. The apparatus of claim 16, and further including a first cylinder for driving the splice head and a second cylinder for driving the splice pad.

19. The apparatus of claim 18, wherein the first cylinder drives the splice head into contact with the films and overcomes a driving force applied by the second cylinder, thereby forcing the splice pad toward the first position.

20. The apparatus of claim 18, wherein the first cylinder drives the splice head into contact with the films, and the second cylinder drives the splice pad into contact with the film track element.

* * * * *